April 14, 1925.
W. J. NACE
1,533,510
HEAT DISTRIBUTING AND OXIDIZING UTENSIL
Filed June 2, 1924
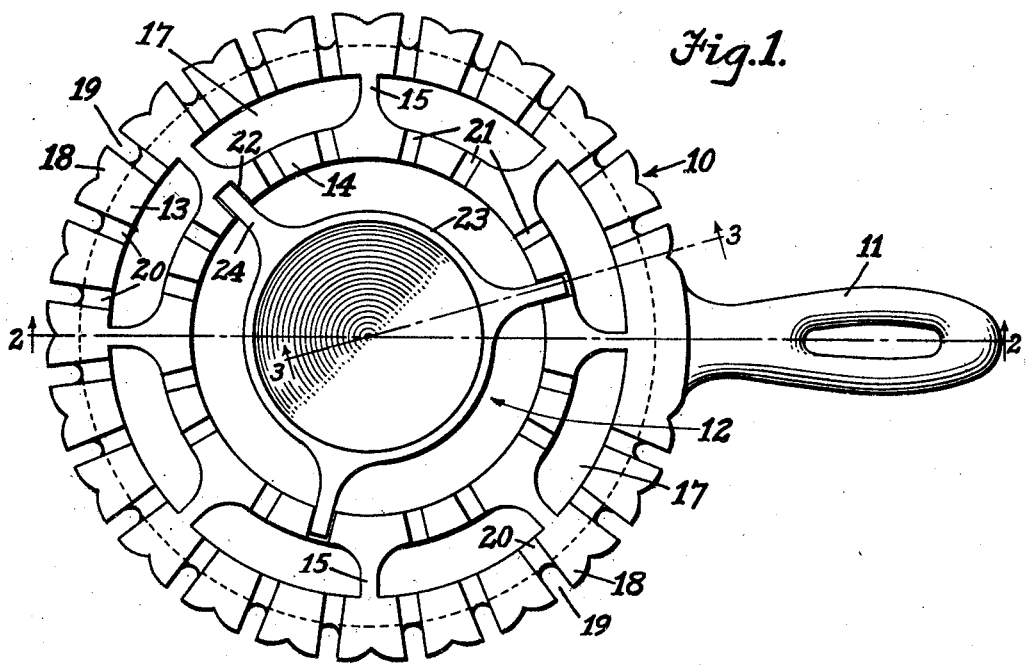
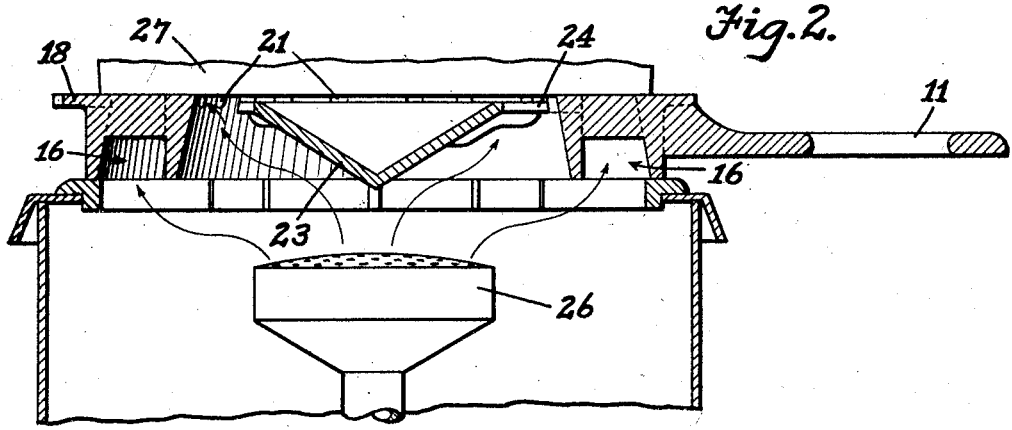
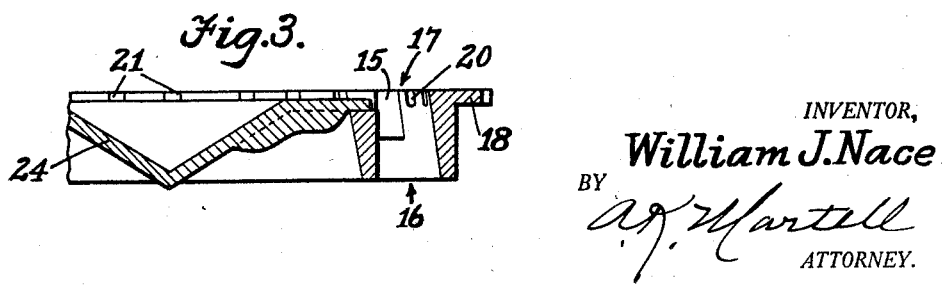
INVENTOR,
William J. Nace
BY
ATTORNEY.

Patented Apr. 14, 1925.

1,533,510

UNITED STATES PATENT OFFICE.

WILLIAM J. NACE, OF LOS ANGELES, CALIFORNIA.

HEAT DISTRIBUTING AND OXIDIZING UTENSIL.

Application filed June 2, 1924. Serial No. 717,313.

*To all whom it may concern:*

Be it known that I, WILLIAM J. NACE, a citizen of the United States, residing at Los Angeles, in the county of Los Angeles and State of California, have invented new and useful Improvements in a Heat Distributing and Oxidizing Utensil, of which the following is a specification.

My invention relates to heat distributing and oxidizing devices and more particularly to a utensil for use on gas plates, gas ranges, stoves, furnaces and the like which, when placed between a burner and a cooking vessel or similar article, will cause a relatively even distribution of heat under such vessel or other article, and will simultaneously promote oxidation of the fuel so that complete combustion is obtained.

As is well known, in all forms of gas stoves and oil stoves, more or less carbon monoxide escapes from the burners because of imperfect oxidation, thus vitiating the air in the vicinity of such stoves and endangering the health of persons working in rooms in which they are used, if not actually jeopardizing their lives. Such imperfect oxidation also causes a waste of fuel and consequently an unnecessary expense. Furthermore, all burners used on such stoves have a heating area in which the heat is most intense at the center, so that in cooking there is always a tendency for food to burn at the center of the vessel.

The main object of my invention is to provide a utensil which when interposed between a burner and a cooking vessel will spread the flame of the burner radially outward from its center and distribute the heat more uniformly over the bottom of the vessel.

Another object is to provide a utensil of the character described which will hold the heated fuel gases under the cooking vessel until complete oxidation takes place, thus eliminating poisonous fumes and intensifying the heat so that a material saving of fuel is effected.

Other objects and advantages will appear hereinafter and while I show herewith and will describe a preferred form of construction, I desire to be understood that I do not confine my invention to such preferred form but that various changes and adaptations may be made therein without departing from the spirit of my invention as hereinafter claimed.

Referring to the drawings which accompany this specification and form a part thereof:

Fig. 1 is a plan view of a heat distributing and oxidizing utensil embodying the principles of my invention.

Fig. 2 is a sectional view of the utensil shown in Fig. 1 taken on line 2—2 of that figure, and parts of a stove and a cooking vessel illustrating its use.

Fig. 3 is a fragmentary sectional view taken on line 3—3 of Fig. 1 showing details of the utensil not disclosed in Fig. 2.

My heat distributing and oxidizing utensil is preferably made in two parts, an outer member 10, provided with a handle 11, and an inner member 12 removably mounted thereon. The outer member consists of a metal frame in the form of two concentric rings 13 and 14 connected by regularly spaced radial bars 15 so that an annular opening 16 is left between the rings below the radial bars and arcuate openings 17 are formed between the bars.

A peripheral flange 18 extends from handle 11 around the upper side of outer ring 13 and slots 19 are cut through this flange and the upper part of ring 13, which form radial grooves 20 communicating between openings 17 and the outer periphery of member 10. Similar radial grooves 21 are formed in the upper edge of inner ring 14, the latter grooves being in staggered relation radially to grooves 20 of the outer ring.

Slots 22 in inner ring 14 are also provided to receive parts of the inner member hereinafter described.

Inner member 12 has a central plate 23 made in the form of a hollow inverted cone which has radial supporting arms 24 formed thereon, the ends of the supporting arms being adapted to rest in slots 22 so that they may be readily lifted therefrom.

When inner member 12 is in its normal position as shown in Fig. 1, its upper surface is maintained slightly below that of outer member 10 and arcuate openings 25 are formed between it and inner ring 14 of the outer member. Grooves 21 communicate between these openings and openings 17 of the outer member.

As illustrated in Fig. 2, my heat distributing and oxidizing utensil, when in use, is placed over the burner 26 of a gas or oil stove and a cooking vessel 27 is set centrally thereon so that its periphery coincides with outer ring 13 of the utensil. As indicated by the arrows, inner member 12 acts as a baffle plate, directing the fuel gases and flames outward from the center so that they pass upward through annular opening 16 and arcuate openings 17 and 25 and outward under the cooking vessel through grooves 20 and 21, thus distributing the heat uniformly under the surface of the cooking vessel. After a time the heat distributing utensil becomes heated to a degree which aids in the oxidation of the fuel gases passing through and around its various parts and gives off heat for a considerable time after the burner has been turned out.

In case a smaller cooking vessel is to be used the inner member 12 may be removed by lifting it out of slots 22 and leaving the center open so that flames and gases strike the center of the cooking vessel and spread radially outward passing through grooves 21 of inner ring 12.

Having thus illustrated and described my invention, I claim:

1. A heat distributing and gas oxidizing utensil comprising a circular outer member provided with a handle and having passages from its upper to its lower surfaces and grooves in its upper surface communicating with said passages, and an inner member adapted to be removably supported in the center of said outer member so that vertical openings are left between said outer and inner members through which heat and fuel gas may pass.

2. A heat distributing and oxidizing utensil for use with gas stoves and oil stoves, comprising an outer member and an inner member removably supported in the center thereof, said outer member having an inner ring and an outer ring connected by radial bars and said inner member having radial supporting arms which rest on the inner ring of said outer member, so that when placed over a burner said outer and inner members cooperate to direct fuel gases and heat through openings in and between them against cooking vessels and the like resting thereon.

3. A heat distributing and oxidizing utensil, for use on gas and oil stoves, comprising a circular outer member provided with a handle and an inner member removably supported in the center of said outer member, said outer member having two concentric rings connected by radial bars, so that vertical openings are left between them, and said inner member being in the form of an inverted hollow cone with radial supporting arms resting on said outer member so that other vertical openings are left between said inner and outer members, all of said openings serving to direct fuel gas and heat upwardly from a burner against a cooking vessel and radially thereunder.

WILLIAM J. NACE.